UNITED STATES PATENT OFFICE.

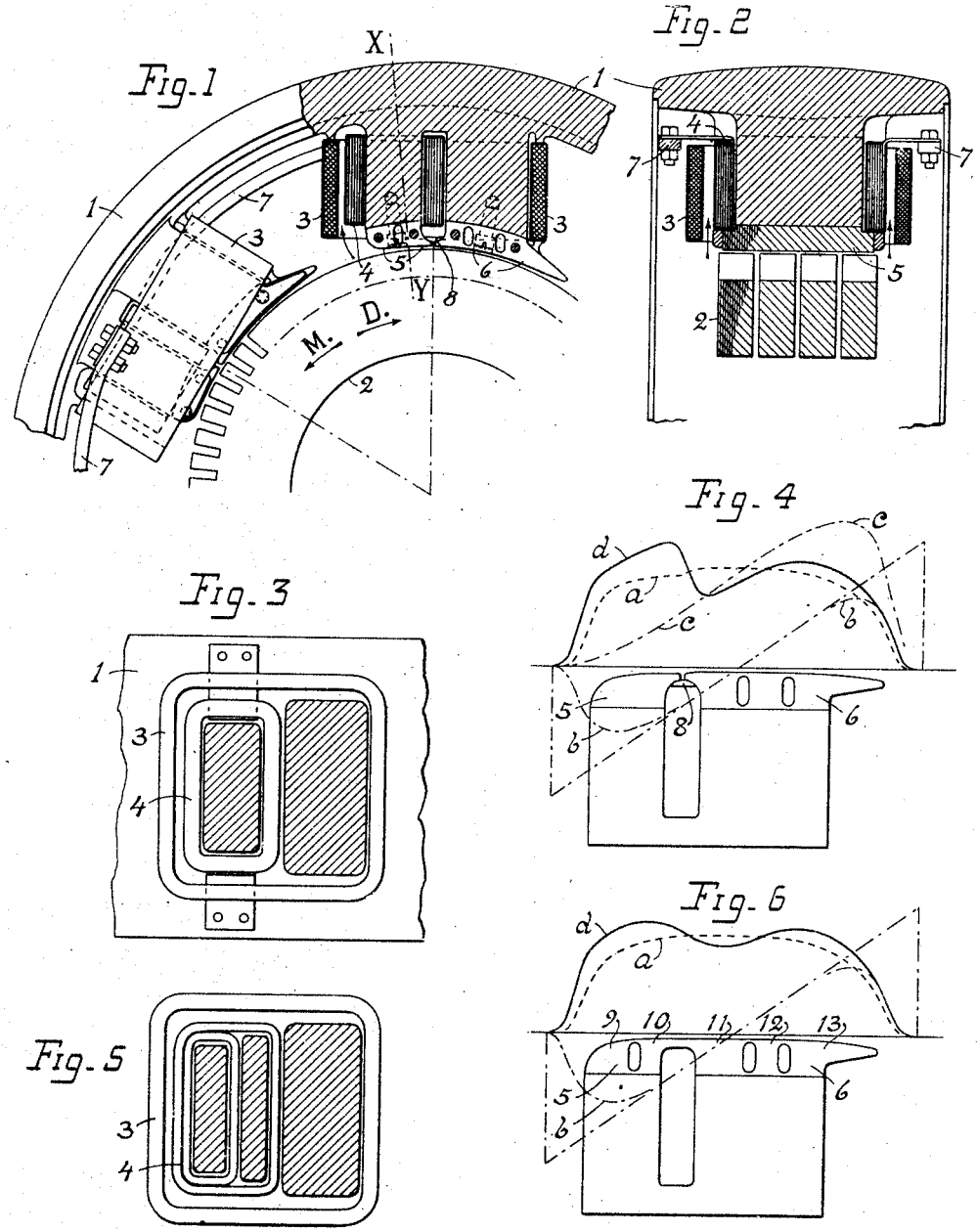

ROBERT LUNDELL, OF NEW YORK, N. Y.

DYNAMO-ELECTRIC MACHINE.

1,045,158.  Specification of Letters Patent.  Patented Nov. 26, 1912.

Application filed February 20, 1909. Serial No. 479,173.

*To all whom it may concern:*

Be it known that I, ROBERT LUNDELL, a citizen of the United States, and resident of New York city, borough of Manhattan, county and State of New York, have made a new and useful Invention in Dynamo-Electric Machines, of which the following is a specification.

My present invention relates to direct current dynamos and motors, provided with both shunt and series field windings and designed to run in a constant direction.

It particularly relates to that class of direct current machines, in which perfect commutation is obtained by means of a positive commutating field, which serves to reverse the current in the commutated armature coils.

The object of the invention is to secure the advantages of a strong commutating field without the aid of auxiliary "interpoles", and further to secure the advantages of an even distribution of the field flux at all loads (*i. e.* no appreciable distortion in spite of a large armature reaction) without the aid of the elaborate compensating windings usually employed to attain this desirable result.

My invention consists in placing a strong series winding upon that portion of the pole which, otherwise, would be excessively weakened by the armature reaction and in "choking" the field flux by saturation at all points in the poles and the pole-faces, where the cross-magnetizing effect of the armature reaction and the field excitation would, otherwise, cause the density of the field flux across the air-gap to become abnormal.

I am enabled, by properly choking the flux at all such points, to make a simple series winding concentrated upon a comparatively small portion of the pole serve the three fold purpose of a commutating winding, a compensating winding, and a winding for effecting proper compounding.

My invention further consists in a novel arrangement of the poles and the pole-faces, by which a section of the pole-face, which is subjected to an excess of combined magneto-motive force, is caused to distribute its excess of flux through another adjacent section, which is suffering from a lack of sufficient magneto-motive force.

The invention also comprises certain novel arrangements of the various details for effecting improved ventilation and a saving of space and material.

My present invention is a direct improvement upon an earlier invention described by me in U. S. Patent No. 571,310 of Nov. 10th, 1896, by which the shifting or the distortion of the magnetic field at full load was in a great measure overcome.

The invention can also be said to be an improvement upon those forms of direct current machines in which series field coils are wound over only a portion of the main pole, such forms having been suggested by Swinburne in 1886 (see *Journ. Soc. Teleg. Engineers*, XV. 542, 1886) by Higham in 1889 (see U. S. Patent No. 400,680, April 2nd, 1889) by E. Thomson in 1891 (see U. S. Patent No. 459,422, Sept. 15th, 1891) and others.

The present problem, however, was not solved by any of the previous forms above referred to, because, if the series winding in any of these forms were made sufficiently powerful to serve as a commutating and a compensating winding, such machines would suffer either from excessive over-compounding or from excessive distortion of the field flux, or from both of these defects.

It will be understood by those skilled in the art that, in order to obtain a positive commutating field, the magneto-motive force of the armature at the points of commutation must not only be fully neutralized, but must be over-balanced by a considerable amount, so that there will be a positive commutating flux thrown back over the coils which are undergoing commutation.

My invention will best be understood by reference to the accompanying drawings, in which, Figure 1 illustrates in side elevational view a portion of a multi-polar dynamo electric machine, the upper pole with its field coils being shown in section. Fig. 2 is a sectional view of the machine taken on the line X—Y of Fig. 1, looking from left to right. Fig. 3 is a sectional view of one of the poles, looking toward the yoke of the machine. Fig. 4 is chiefly a diagrammatic view, which illustrates the various magnetic conditions across the air-gap (induction diagrams) of a machine constructed according to Fig. 1. Fig. 5 is another sectional view of one of the poles illustrating a modification in the disposition of the series winding. Fig. 6 shows additional "induction diagrams" corresponding to a modification or a refinement of the construction of the pole shoes, as indicated in the figure.

Referring now to Fig. 1 in detail, 1 represents a yoke or field magnet, provided with internally projecting poles. Each pole consists of two distinct portions, as clearly shown, one being smaller than the other. (See also Fig. 3.) 2 represents an armature core of well known type provided with slots for the armature conductors. 3 represents the shunt field winding, which preferably is of the wrapped ("mummified") type, thereby avoiding the expense of any sustaining shell for the coil. 4 represents the series winding which surrounds the small portion of the pole only. This winding is preferably made of sheet or strip copper, as indicated by the fine vertical lines. The heavy connections for this winding are arranged as clearly shown by Figs. 2 and 3. 5 represents a laminated pole-shoe for the smaller portion of the pole and 6 shows an elongated pole-shoe for the larger portion of the pole. The laminations of the said pole-shoes are firmly held together on rivets between sustaining end-plates and they are bolted to their respective pole cores according to well known construction.

The material employed in the construction of the field magnet is supposed to be cast steel and sheet steel (iron) of good permeability, the saturation curve of which should preferably be characterized by a comparatively sharp bend, (where the saturation commences) and by comparatively straight portions above and below the said bend. The surfaces of the pole-faces and the various iron sections of the pole-cores and the pole-shoes are so proportioned relative to one another that the iron in the large pole-core is worked just above the bend in the saturation curve, and the trailing end of its pole-shoe (see portion 13 of Fig. 6) should be highly saturated at no load. The smaller portion of the pole, which corresponds to the small pole-shoe 5 should preferably be worked below the bend in the saturation curve—from no load to full load, although this is not absolutely necessary in this form of construction.

Figs. 1, 2 and 3 show clearly the arrangement of the shunt and the series coils. It should be pointed out that the series coil has a very small "mean length of turn" (see Fig. 3) which results of course in low $I^2R$ losses and low weight of copper for a given number of ampere-turns. As the series coil is entirely inclosed by the shunt coil it is necessary for sake of proper ventilation that air ducts be provided. The design is, therefore, such that a strong air current is thrown from the armature between the two field coils, as clearly shown by the arrows in Figs. 1 and 2.

Referring now to Fig. 4 it should be pointed out that this diagram is drawn to represent the magnetic conditions across the air-gap of a compound wound dynamo, having an armature reaction which is so great that the armature ampere-turns per pole (counting the full polar pitch) somewhat exceed the combined ampere-turns for the air-gap and the teeth. Curve $a$ represents the no-load induction, attention being called to the fact that the air-gap under the small pole-shoe 5 is slightly larger than under the other pole-shoe 6, so that the maximum density under 5 may be somewhat lower than the maximum density under 6. Curve $b$ indicates the cross-magnetizing effect at full load of the armature, and curve $c$ gives an approximate representation of the resultant inductive effect across the air-gap, if the poles were solid and without any means for preventing the distortion. The poles are, however, divided into two distinct and unequal portions, and the series winding surrounding the smaller portion is made so strong that its ampere-turns will fully over-balance the negative armature ampere-turns at the points of commutation. This causes the induction at full load under the small pole-shoe to assume a value approximately corresponding to the first portion of curve $d$.

Examining now the effect of the armature reaction upon the larger portion of the pole, it will be found that the ampere-turns, acting upon the magnetic circuit through the larger pole-core at full load, are as follows:—Shunt ampere-turns plus armature ampere-turns under the small pole-shoe 5 minus armature ampere-turns due to the double angle of lead. As the small pole-shoe covers a correspondingly small portion of the polar arc, it follows that the magnetizing effect upon the larger portion of the pole has increased but little from no-load to full-load, and that the total flux has changed only by a very small amount. But the cross-magnetizing effect of the armature upon the large pole-shoe 6 will cause the flux to crowd over toward the saturated pole tip, where, however, it is effectively stopped by saturation. The net result, therefore, will be only a "dip" in the full-load induction curve $d$, said dip taking place under the inner corner of the large pole-shoe. Too great a dip in the curve would cause additional iron losses in the armature teeth, hence it is of importance that the full load induction curve should be as even as possible. By magnetically bridging the space between the two pole-shoes, say by a small iron strip, as indicated by 8 in Fig. 4, it becomes possible to lower the induction at the inner corner of the pole-shoe 5, where it is too high, and to raise the induction at the inner corner of 6, where it is too low. But there is danger of disturbing the commutation field at the outside corner of pole-shoe 5 by such means, unless the small pole or pole-shoe be divided into a saturated and an unsaturated portion. Fig. 6 shows such an arrangement. The two pole-shoes 5 and 6 are here magnetically united and the section marked 10 of the small pole-shoe is of such cross-section relative to its corresponding pole surface that it is highly saturated at no-load, same as the portion marked 13. Section 10 of the smaller pole-shoe, which at full load is subjected to an excess of magneto-motive force, is in this manner caused to distribute its excess of flux through the adjacent section 11 of the large pole-shoe, which at full load suffers from too small a magneto-motive force. The final result is an improvement in the full load induction curve $d$, as indicated in Fig. 6.

In very large and high speed (turbine driven) generators, the series winding may in addition be divided or distributed upon two small cores, as shown by Fig. 5, the outer core having about twice as many ampere-turns as the inner core.

It will be understood that the cross-section of the small pole-core is made of such dimensions that the series-ampere-turns around the same, which are necessary for proper over-compensation of the M. M. F. of the armature, will, in addition, be just sufficient to effect proper compounding. If the small portion of the pole is made very small as compared to the large portion there would be no compounding at all and the series winding would serve the sole purpose of a commutating winding. This arrangement would be useful in connection with a constant speed motor which is to run in only one direction.

Having thus described my invention what I claim and desire to secure by Letters Patent of the United States is—

1. A dynamo electric machine having each of its poles divided into a small and a large portion, a series winding surrounding the said small portion and a shunt winding surrounding both of said portions; in combination with laminated pole shoes which practically close the space or opening between the said polar portions at their pole-face surfaces, substantially as described.

2. A dynamo electric machine having its pole cores divided into a small and a large portion, the latter being provided with a polar extension which materially increases its pole-face area; in combination with a series winding around the said small portion and a shunt winding surrounding both of the said portions as well as the said series winding, substantially as described.

3. A dynamo electric machine having its pole cores divided into a small and a large portion, the latter being provided with a polar extension which materially increases its pole-face area; in combination with a series winding around the said small portion, a shunt winding surrounding both of the said portions and means for magnetically connecting the inner pole-faces of the said small and large portions, substantially as described.

4. A dynamo electric machine having each of its poles divided into a small and a large portion, said polar portions being in turn subdivided close to their pole-faces into two or more minor portions or sections; in combination with means for magnetically connecting the pole faces of the said small and large portions, substantially as and for the purpose described.

5. A dynamo electric machine having each of its poles divided into two distinct portions, one of said portions being of less width in the direction of the shaft than the second portion, said second portion being subdivided close to its pole-face into two or more minor portions or sections and provided with a polar extension which materially increases its pole-face area; in combination with a series winding surrounding the first mentioned polar portion and a shunt winding surrounding both of said portions, substantially as and for the purpose described.

6. A dynamo electric machine having each of its pole-cores divided into one or more small portions on one side of the pole and a large portion on the opposite side of the pole, said large polar portion being subdivided close to its pole-face into two or more minor portions or sections; in combination with means for magnetically connecting the pole faces of the said small and large portions, substantially as and for the purpose described.

7. A dynamo electric machine having each of its poles divided into a small and a large portion, said polar portions being in turn subdivided close to their pole-faces into two or more minor portions or sections; in combination with a series winding surrounding the first mentioned small polar portion and a shunt winding surrounding all of said portions, substantially as and for the purpose described.

8. A dynamo electric machine having its pole cores divided into a large and a small portion, the smaller portion being of less width in the direction of the shaft than the larger portion; in combination with a series winding around the said small portion, a shunt winding surrounding both pole cores as well as the said series winding, and providing air spaces on the inner sides of the shunt winding, substantially as shown and described.

In testimony whereof I have signed my name to this specification in the presence of two subscribing witnesses.

ROBERT LUNDELL.

Witnesses:
M. F. KEATING,
H. J. SCHUTTE.